US012777383B2

(12) United States Patent
Wu et al.

(10) Patent No.: US 12,777,383 B2
(45) Date of Patent: Oct. 27, 2026

(54) METHOD AND APPARATUS FOR UE-TO-NETWORK RELAY HANDOVER

(71) Applicant: LENOVO (BEIJING) LIMITED, Beijing (CN)

(72) Inventors: Lianhai Wu, Beijing (CN); Mingzeng Dai, Shanghai (CN); Jing Han, Beijing (CN); Congchi Zhang, Shanghai (CN); Ran Yue, Beijing (CN)

(73) Assignee: Lenovo (Beijing) Limited, Beijing (CN)

( * ) Notice: Subject to any disclaimer, the term of this patent is extended or adjusted under 35 U.S.C. 154(b) by 313 days.

(21) Appl. No.: 18/560,226

(22) PCT Filed: May 10, 2021

(86) PCT No.: PCT/CN2021/092885
§ 371 (c)(1),
(2) Date: Nov. 10, 2023

(87) PCT Pub. No.: WO2022/236631
PCT Pub. Date: Nov. 17, 2022

(65) Prior Publication Data

US 2024/0236789 A1 Jul. 11, 2024

(51) Int. Cl.

| | |
|---|---|
| ***H04W 36/00*** | (2009.01) |
| ***H04W 76/27*** | (2018.01) |
| ***H04W 88/04*** | (2009.01) |

(52) U.S. Cl.
CPC ......... *H04W 36/03* (2018.08); *H04W 36/033* (2023.05); *H04W 76/27* (2018.02); *H04W 88/04* (2013.01)

(58) Field of Classification Search
CPC ........................... H04W 36/03; H04W 36/033
See application file for complete search history.

(56) References Cited

U.S. PATENT DOCUMENTS

| | | | |
|---|---|---|---|
| 2013/0183971 | A1 | 7/2013 | Tamaki et al. |
| 2018/0092017 | A1 | 3/2018 | Freda et al. |

(Continued)

FOREIGN PATENT DOCUMENTS

| | | | |
|---|---|---|---|
| CN | 111565376 | A | 8/2020 |
| CN | 112119653 | A | 12/2020 |
| WO | 2017135877 | A1 | 8/2017 |

OTHER PUBLICATIONS

PCT/CN2021/092885, "International Search Report and Written Opinion", International Searching Authority, Feb. 11, 2022, pp. 1-6.

(Continued)

*Primary Examiner* — Justin Y Lee
(74) *Attorney, Agent, or Firm* — Kunzler Needham Hilton

(57) ABSTRACT

Disclosed are methods and apparatus for user equipment to network relay handover. An embodiment of the subject application provides a method performed by a relay node. The method includes receiving a radio resource control reconfiguration message including a reconfiguration with synchronization from a serving cell, and transmitting a handover associated indication to a remote user equipment via sidelink communication in response to reception of the RRC reconfiguration message including the reconfiguration with synchronization. In addition, the relay node may transmit the indication associated with successful handover to the remote UE via sidelink communication after successful handover.

20 Claims, 8 Drawing Sheets

(56) References Cited

U.S. PATENT DOCUMENTS

| | | | |
|---|---|---|---|
| 2020/0037218 A1 | 1/2020 | Karampatsis et al. | |
| 2021/0176681 A1* | 6/2021 | Ozturk ............ | H04W 36/00838 |
| 2022/0174563 A1* | 6/2022 | Xu ...................... | H04W 36/085 |
| 2022/0264387 A1* | 8/2022 | Kim .................. | H04W 74/0833 |
| 2022/0377822 A1* | 11/2022 | Wang .................... | H04W 76/14 |
| 2023/0363020 A1* | 11/2023 | Back ..................... | H04W 76/20 |
| 2024/0031890 A1* | 1/2024 | Cheng ................. | H04W 36/033 |
| 2024/0098588 A1* | 3/2024 | Da Silva ............. | H04W 36/362 |

OTHER PUBLICATIONS

Ericsson, "Discussion on service continuity for L2 sidelink relay", 3GPP TSG-RAN WG2 #113bis-e R2-2103663, Apr. 12-20, 2021, pp. 1-5.

* cited by examiner

METHOD AND APPARATUS FOR UE-TO-NETWORK RELAY HANDOVER

TECHNICAL FIELD

The present disclosure relates to wireless communication technologies, and especially to methods and apparatus for user equipment (UE) to Network relay handover.

BACKGROUND OF THE INVENTION

UE-to-Network Relay functionality was introduced to Long Term Evolution (LTE) cellular networks by the 3rd Generation Partnership Project (3GPP) in Release 13. In this technology, UEs acting as relay nodes are used to extend network coverage to cell-edge and out-of-coverage remote UEs. One important part of this functionality is direct discovery, which is used by the remote UEs willing to reach the network to detect the relay nodes in proximity that can provide the desired connectivity service. Other network nodes, such as a non-terrestrial network (NTN) node, may also act as relay nodes.

UE-to-Network relay functionality may be, for example, used for further explore coverage extension for sidelink-based communication, where a remote UE may use direct device-to-device communication between the remote UE and a relay node to connect to a serving cell.

For example, based on a determination of network coverage status, at least one UE is initiated and selected to act as a relay node. The radio interface link quality of the relay node can be evaluated and the relay node can be configured to send an indication of the radio interface link quality to a remote UE. Based on the determined network coverage status and selection of a relay node, the remote UE is controlled by a base station (BS) for the relay node discovery and selection either directly or via the relay node.

SUMMARY

Embodiments of the present disclosure provide solutions related to UE-to-Network relay handover.

In some embodiments, a method performed by a relay node is provided. The method includes receiving a radio resource control (RRC) reconfiguration message including a reconfiguration with synchronization from a serving cell; and transmitting a handover associated indication to a remote UE via sidelink (SL) communication in response to reception of the RRC reconfiguration message including the reconfiguration with synchronization.

In some embodiments, the RRC reconfiguration message further includes at least one of: a first indication indicating whether a PC5 connection between the relay node and the remote UE is to be released when the relay node performs handover, and a second indication indicating whether a target cell associated with the handover of the relay node supports relay functionality.

In some embodiments, the handover associated indication includes an identifier (ID) of a target cell associated with handover of the relay node.

In some embodiments, the handover associated indication indicates reception of the RRC reconfiguration message including the reconfiguration with synchronization or indicates that the relay node performs handover.

In some embodiments, the method further includes indicating, by an access stratum (AS) layer of the relay node, reception of the RRC reconfiguration message including the reconfiguration with synchronization to an upper layer of the relay node.

In some embodiments, the method further includes releasing buffered uplink (UL) data received from the remote UE and buffered downlink (DL) data received from a base station (BS) when the relay node performs handover.

In some embodiments, the method further includes storing buffered UL data received from the remote UE in response to the reception of the RRC reconfiguration message including the reconfiguration with synchronization, and/or transmitting the buffered UL data to a target cell in response to successful handover to the target cell.

In some embodiments, wherein the handover associated indication includes a data forwarding indication, and the method further includes transmitting buffered DL data received from a BS to the remote UE when the relay node performs handover.

In some embodiments, the method further includes adding an end-mark indication in a last packet of the buffered DL data transmitted to the remote UE.

In some embodiments, the method further includes transmitting a handover success indication to the remote UE in response to successful handover to a target cell.

In some embodiments, the handover success indication includes an ID of the target cell.

In some embodiments, the method further includes establishing a Uu bearer associated with the remote UE in a link between the relay node and a target cell in response to the successful handover to the target cell.

In some embodiments, the method further includes releasing a PC5 connection between the relay node and the remote UE after the relay node transmits all the buffered DL data.

In some embodiments, a method performed by a remote UE is provided. The method includes accessing a serving cell of a BS via a relay node, and receiving a handover associated indication from the relay node, wherein the handover associated indication indicates that the relay node receives a first RRC reconfiguration message including a reconfiguration with synchronization from the serving cell.

In some embodiments, the method further includes receiving a second RRC reconfiguration message from the serving cell, wherein the second RRC reconfiguration message includes a list of at least one candidate relay node belonging to the serving cell and/or a list of at least one candidate relay node belonging to the same BS.

In some embodiments, the method further includes performing measurement toward at least one candidate relay node and at least one neighbour cell, and transmitting a measurement report to the serving cell of the BS, wherein the measurement report includes at least one of: an ID of the serving cell, at least one serving BS ID of the at least one neighbour cell, and SL reference signal receiving power (RSRP) information.

In some embodiments, the handover associated indication includes an ID of a target cell associated with handover of the relay node.

In some embodiments, the method further includes suspending data transmission terminated at the serving cell in response to reception of the handover associated indication.

In some embodiments, the method further includes indicating, by an upper layer of the remote UE to an AS layer of the remote UE, an indication to release a PC5 connection between the relay node and the remote UE in response to that the upper layer of the remote UE receives the handover associated indication from the relay node.

In some embodiments, the handover associated indication includes a data forwarding indication, and the method further includes receiving buffered downlink (DL) data from the relay node in response to the data forwarding indication.

In some embodiments, an end-mark indication is included in a last packet of the buffered DL data received from the relay node.

In some embodiments, the method further includes releasing a PC5 connection between the relay node and the remote UE after all the buffered DL data is received.

In some embodiments, the method further includes receiving a handover success indication indicating successful handover of the relay node to a target cell.

In some embodiments. the handover success indication includes an ID of the target cell.

In some embodiments, the method further includes transmitting an RRC connection establishment request or re-establishment request to the target cell.

In some embodiments, the method further includes receiving a rejection of the RRC connection establishment request or re-establishment request from the target cell.

In some embodiments, the method further includes performing a relay reselection in response to receiving the rejection of the RRC connection establishment request or re-establishment request from the target cell.

In some embodiments, the method further includes triggering transmission of packet data convergence protocol (PDCP) status report to the target cell after the remote UE re-establishes to the target cell.

In some embodiments, the method further includes performing a cell reselection or relay reselection to determine a selected cell after the PC5 connection between the remote UE and the relay node is released, and transmitting an RRC connection establishment request or re-establishment request to the selected cell.

In some embodiments, the method further includes transmitting an ID of the relay node, an ID of the serving cell of the relay node, and an ID of a target cell associated with handover of the relay node to the target cell.

In some embodiments, the method further includes triggering transmission of PDCP status report to the selected cell after the remote UE re-establishes to the selected cell.

In some embodiments, a method performed by a BS is provided. The method includes receiving a measurement report from at least one of a relay node and a remote UE, and transmitting a first RRC reconfiguration message including a reconfiguration with synchronization to the relay node based on the measurement report.

In some embodiments, the first RRC reconfiguration message further includes at least one of: a first indication indicating whether a PC5 connection between the relay node and the remote UE is to be released, and a second indication indicating whether a target cell associated with handover of the relay node supports relay functionality.

In some embodiments, the method further includes transmitting a second RRC reconfiguration message to the remote UE, wherein the second RRC reconfiguration message includes a list of at least one candidate relay node belonging to a same serving cell as the relay node and/or a list of at least one candidate relay node belonging to the same BS.

In some embodiments, the method further includes receiving a third indication indicating to forward data associated with the remote UE to a target cell after handover of the relay node to the target cell is successful and an end-to-end connection between the remote UE and the target cell is established.

In some embodiments, the method further includes forwarding the data associated with the remote UE to the target cell in response to the third indication.

In some embodiments, the method further includes transmitting an association between an ID of the remote UE and a logical channel to the target cell.

In some embodiments, the method further includes receiving a fourth indication to forward data associated with the remote UE to a selected cell after an end-to-end connection between the remote UE and the selected cell is established in the case that the selected cell belongs to a different BS.

In some embodiments, the method further includes forwarding the data associated with the remote UE to the selected cell in response to the fourth indication.

In some embodiments, an apparatus includes a non-transitory computer-readable medium having stored thereon computer-executable instructions, a receiving circuitry, a transmitting circuitry, and a processor coupled to the non-transitory computer-readable medium, the receiving circuitry and the transmitting circuitry. The computer-executable instructions are executable by the processor to cause the apparatus to implement various methods according to embodiments of the present application.

In some embodiments, an apparatus includes a processor, a wireless transmitter coupled to the processor, and a wireless receiver coupled to the processor. The processor is configured to perform various methods according to embodiments of the present application with the wireless transmitter and the wireless receiver.

The details of one or more examples are set forth in the accompanying drawings and the description below. Other features, objects, and advantages will be apparent from the description and drawings, and from the claims.

BRIEF DESCRIPTION OF THE DRAWINGS

In order to describe the manner in which advantages and features of the present disclosure can be obtained, a description of the present disclosure is rendered by reference to specific embodiments thereof which are illustrated in the appended drawings. These drawings depict only exemplary embodiments of the present disclosure and are not therefore intended to limit the scope of the present disclosure.

DETAILED DESCRIPTION

The present disclosure relates to methods and apparatus for relay handover in a UE-to-Network case, and especially for successful relay handover.

Figure 1:
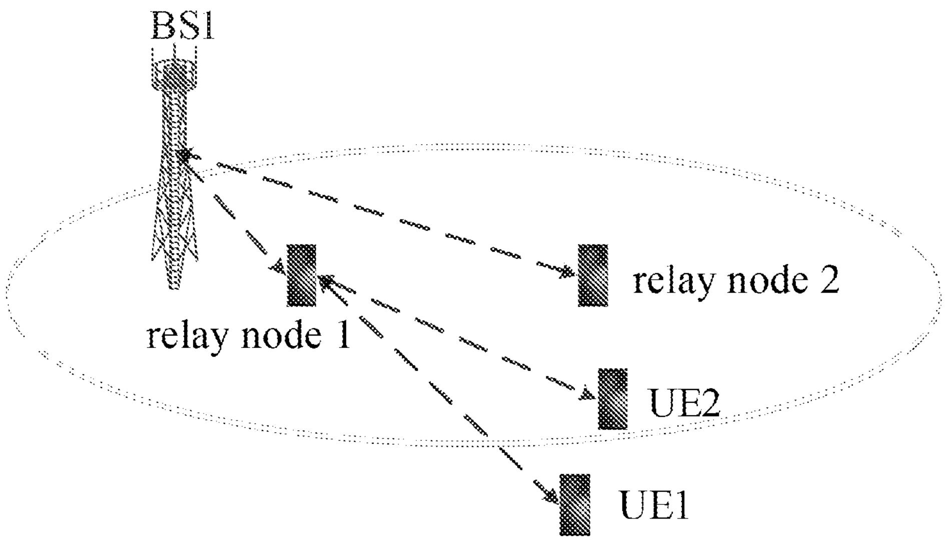
FIG. 1 illustrates an exemplary relay connection.

FIG. 1 illustrates an exemplary relay connection.

As shown in FIG. 1, some UEs (e.g., UE1 or UE2) may be located at or near a cell-edge of a BS (e.g., BS1) or out of coverage of the BS. For example, UE1 is out of the coverage of BS1 and can be referred to as an out-of-coverage UE, and UE2 is at the cell-edge of BS1 can be referred to as a cell-edge UE. UE1 and UE2 may access BS1 via a relay node. In the example of FIG. 1, both UE1 and UE2 access BS1 via the same relay node (e.g., relay node 1). In some other examples, UE1 and UE2 may access BS1 via different relay nodes, respectively. For example, UE1 or UE2 may access BS1 via relay node 2. A UE (e.g., UE1 or UE2) accessing a BS via a relay node can be referred to as a remote UE.

In the description of the present disclosure, the BS may also be referred to as an access point, an access terminal, a base, a base unit, a macro cell, a Node-B, an evolved Node B (eNB), a gNB, a Home Node-B, a relay node, or a device, or described using other terminology used in the art.

According to some embodiments of the present disclosure, the UE(s) may include computing devices, such as desktop computers, laptop computers, personal digital assistants (PDAs), tablet computers, smart televisions (e.g., televisions connected to the Internet), set-top boxes, game consoles, security systems (including security cameras), vehicle on-board computers, network devices (e.g., routers, switches, and modems), or the like.

According to some other embodiments of the present disclosure, the UE(s) may include a portable wireless communication device, a smart phone, a cellular telephone, a flip phone, a device having a subscriber identity module, a personal computer, a selective call receiver, or any other device that is capable of sending and receiving communication signals on a wireless network.

According to some other embodiments of the present disclosure, the UE(s) may include wearable devices, such as smart watches, fitness bands, optical head-mounted displays, or the like.

Moreover, the UE(s) may also be referred to as a subscriber unit, a mobile, a mobile station, a user, a terminal, a mobile terminal, a wireless terminal, a fixed terminal, a subscriber station, a user terminal, or a device, or described using other terminology used in the art.

Figure 2:
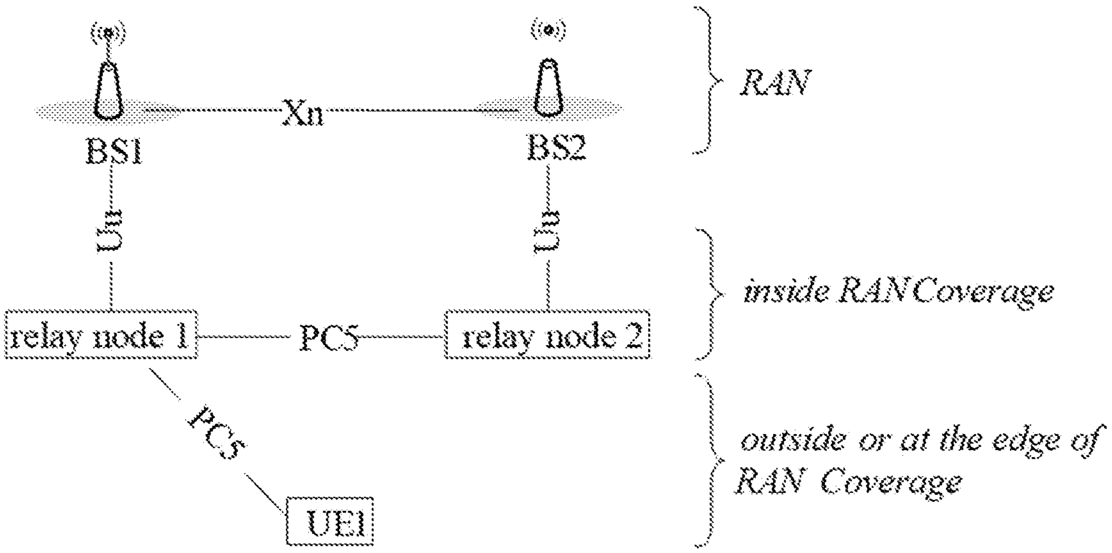
FIG. 2 illustrates an exemplary access network architecture supporting relay functionality.

FIG. 2 illustrates an exemplary access network architecture supporting relay functionality.

As shown in FIG. 2, BSs (e.g., BS1 and BS2) in a radio access network (RAN) may communicate with each other via an Xn interface. UE(s) inside coverage of a BS (also referred to as "inside RAN coverage") may communicate with the BS via a Uu interface. The UE(s) inside RAN coverage may act as relay node(s) (e.g., relay node 1 and relay node 2). Remote UE(s) outside or at the edge of RAN coverage (e.g., UE1) may communicate with UE(s) acting as relay node(s) (e.g., relay node 1) via a PC5 interface. UEs acting as relay nodes may also communicate with each other via a PC5 interface.

It could be understood that FIG. 2 is not intended to limit the interfaces between the BSs, between BSs and UEs, and between UEs. Some other kinds of interfaces may be introduced with the development of network architectures and new service scenarios.

Referring back to FIG. 1 again, data transmissions between BS1 and UE1 are relayed by relay node 1. Relay node 1 may buffer UL data transmitted from UE1 and targeted at BS1, and may buffer DL data transmitted from BS1 and targeted at UE1.

BS1 may receive measurement report(s) from the relay node(s) and/or UE(s), and may transmit a handover command (e.g., an RRC reconfiguration message including a reconfiguration with synchronization) to the relay node(s) based on the measurement report(s). When relay node 1 receives a handover command from its serving cell, relay node 1 may perform handover to another cell. When handover of relay node 1 occurs, how to handle the relay connection between BS1 and remote UE1, the data buffered in relay node 1, data transmission for remote UE1, etc. needs to be taken into consideration.

The present disclosure provides various embodiments, solutions, and methods related to relay handover in detail with reference to the accompanying drawings. The detailed description of the appended drawings is intended as a description of the preferred embodiments of the present invention, and is not intended to represent the only form in which the present invention may be practiced. It should be understood that the same or equivalent functions may be accomplished by different embodiments that are intended to be encompassed within the spirit and scope of the present invention.

It can be contemplated that along with developments of network architectures and new service scenarios, all embodiments in the present application are also applicable to similar technical problems, and moreover, the terminologies recited in the present application may change, which should not affect the principle of the present application.

While operations are depicted in the drawings in a particular order, persons skilled in the art will readily recognize that such operations need not be performed in the particular order shown or in sequential order, or that not all illustrated operations need be performed. For example, to achieve desirable results, sometimes one or more operations can be skipped. Further, the drawings can schematically depict one or more example processes in the form of a flow diagram. However, other operations that are not depicted can be incorporated in the example processes that are schematically illustrated. For example, one or more additional operations can be performed before, after, simultaneously with, or between any of the illustrated operations. In certain circumstances, multitasking and parallel processing can be advantageous.

According to some embodiments of the present disclosure, a remote UE may access a serving cell of a BS via a relay node. The BS may transmit RRC reconfiguration(s) to the relay node. The BS may also transmit RRC reconfiguration(s) to the remote UE. In an embodiment, the BS may provide to the remote UE a list of at least one candidate relay node belonging to the same serving cell and/or a list of at least one candidate relay node belonging to the same BS in, for example, an RRC reconfiguration message.

The relay node may perform measurement(s) toward neighbour cell(s) and report measurement result(s) of the neighbour cell(s) to the BS.

The remote UE may perform measurement(s) toward the candidate relay node(s) and neighbour cell(s) (for example, based on a measurement configuration received from the serving cell), and transmit measurement report(s) to the serving cell of the BS. In some embodiments, the measurement report(s) of the remote UE may include at least one of: an ID of the serving cell, at least one serving BS ID of the neighbour cell(s), and SL RSRP information.

Figure 3:
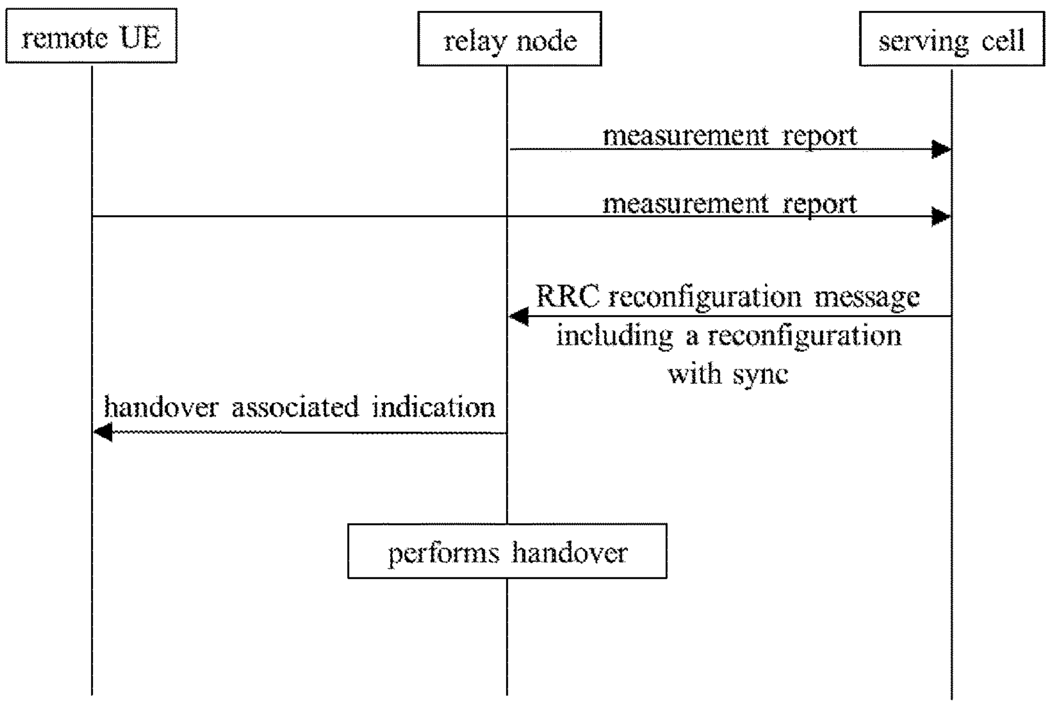
FIG. 3 illustrates an exemplary signaling sequence related to relay handover based on measurement report(s) according to some embodiments of the present disclosure.

FIG. 3 illustrates an exemplary signal sequence related to relay handover based on the measurement report(s) according to some embodiments of the present disclosure.

According to FIG. 3, after the serving cell receives measurement report(s) from the relay node and/or the remote UE, the serving cell may transmit an RRC reconfiguration message including a reconfiguration with synchronization (also referred to as "sync") (i.e., a handover command) to the relay node based on the received measurement report(s) from the relay node and/or the remote UE.

In some embodiments, the RRC reconfiguration message including the reconfiguration with sync may further include at least one of a first indication and a second indication, wherein the first indication indicates whether a PC5 connection between the relay node and the remote UE is to be released when the relay node performs handover, and the second indication indicates whether a target cell associated with the handover of the relay node (i.e., the relay node is to perform handover to the target cell) supports relay functionality.

In response to reception of the RRC reconfiguration message including the reconfiguration with sync, the relay node may initiate a handover procedure. The relay node may also transmit a handover associated indication to the remote UE via SL communication. Although FIG. 3 shows that the handover associated indication is transmitted before the relay node performs handover, it should be understood that the handover associated indication may be transmitted during the handover procedure.

In some embodiments, the handover associated indication includes an ID of the target cell associated with handover of the relay node.

In some embodiments, the handover associated indication indicates reception of the RRC reconfiguration message including the reconfiguration with sync or indicates that the relay node performs handover. For example, the handover associated indication may be an indication of "the reception of handover command" or "handover" transmitted from an AS layer of the relay node to an AS layer of the remote UE.

In some embodiments, service continuity is not considered. In such cases, the relay node may release buffered UL data received from the remote UE and buffered DL data received from the BS when the relay node performs handover.

In some embodiments, service continuity is considered. In such cases, the relay node may store buffered UL data received from the remote UE upon reception of the RRC reconfiguration message including the reconfiguration with sync. The relay node may transmit the buffered UL data to a target cell after a successful handover to the target cell.

In the cases that the service continuity is considered, the relay node may continue to transmit buffered DL data to the remote UE during handover. In some embodiments, the handover associated indication may include a data forwarding indication to inform the remote UE to continue to receive the buffered DL data.

In some embodiments, an end-mark indication is included in the last packet of the buffered DL data. When the remote UE receives the last packet including the end-mark indication, it may determine that the DL data buffered in the relay node are all transmitted to the remote UE.

In some embodiments, upon reception of the handover associated indication from the relay node, the remote UE may suspend data transmission terminated at the serving cell. In some embodiments, after accessing a new cell (e.g., the target cell of the relay node or a cell reselected by the remote UE), the remote UE may continue UL data transmission.

In some embodiments, upon reception of the handover associated indication, the remote UE may release the PC5 connection between the relay node and the remote UE. In some embodiments, the remote UE may release the PC5 connection between the relay node and the remote UE after all the buffered in the relay node are all transmitted to the remote UE, e.g., after the remote UE receives the last packet including the end-mark indication.

In some embodiments, the AS layer of the relay node may indicate the reception of the handover command to an upper layer of the relay node. The upper layer of the relay node may transmit the handover associated indication to an upper layer of the remote UE. The upper layer of the remote UE may indicate, to the AS layer of the remote UE, an indication to release the PC5 connection between the relay node and the remote UE in response to that the upper layer of the remote UE receives the handover associated indication from the relay node. The upper layer of the relay node or the remote UE may be a PC5-S layer or a vehicle-to-everything (V2X) layer.

FIG. 3 illustrates some signaling about a relay node receiving a handover command, e.g., an RRC reconfiguration message including a reconfiguration with sync.

After the relay node receives the handover command, the relay node performs handover to a target cell, and the PC5 connection between the remote UE and the relay node may be kept or may be released. In the case that the PC5 connection is kept, when the relay node accesses the target cell (i.e., the handover is successful), the remote UE may transmit an RRC connection establishment request or re-establishment request to the target cell. It is possible that the target cell of the relay node may reject to perform RRC connection with the remote UE; in this case, the remote UE needs to perform a cell reselection or relay reselection, and the PC5 connection between the relay node and the remote UE is released.

When the relay node receives a handover command and performs handover, in some embodiments, the relay node may release the buffered UL data and the buffered DL data associated with the remote UE without considering service continuity; in some other embodiments, the relay node may continue to transmit the buffered DL data to the remote UE, and store the buffer UL data, which may be forwarded after the handover. The PC5 connection between the remote UE and the relay node may be still kept or released after all the buffered DL data are transmitted to the remote UE, or released directly upon reception of the handover associated indication by the remote UE.

In some embodiments, upon the reception of the RRC reconfiguration message including a reconfiguration with sync (i.e. upon the reception of a handover command), the relay node releases buffered DL data and buffered UL data associated with the remote UE, the PC5 connection between the remote UE and the relay node is released, and the remote UE needs to perform relay reselection or cell reselection.

Figure 4:
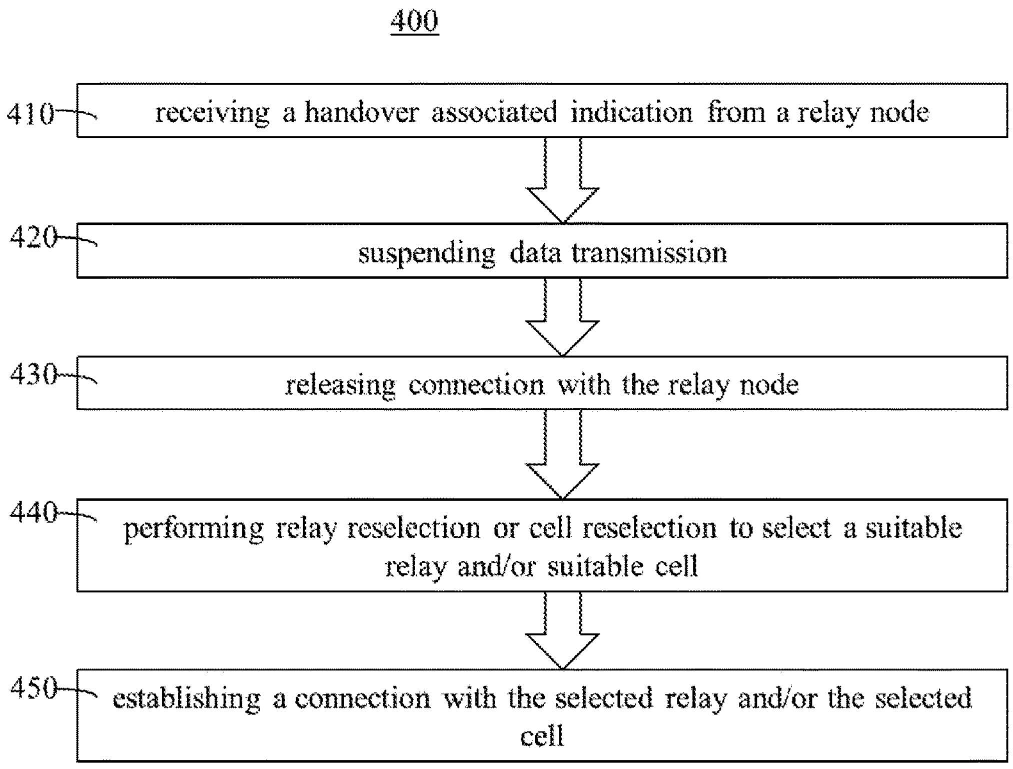
FIG. 4 illustrates a flow chart of an exemplary method performed by a remote UE according to some embodiments of the present disclosure.

FIG. 4 illustrates a flow chart of an exemplary method 400 performed by a remote UE (e.g., UE1 in FIG. 1 or FIG. 2) upon reception of a handover associated indication from a relay node according to some embodiments of the present disclosure. In the example of FIG. 4, the relay node releases buffered DL data and buffered UL data associated with the remote UE (i.e., the service continuity is not considered) upon reception of a handover command from a serving cell, and the PC5 connection between the remote UE and the relay node is released when the relay node performs handover.

As shown in FIG. 4, the method 400 includes at least an operation 410, an operation 420, an operation 430, an operation 440, and an operation 450.

In operation 410, the remote UE receives a handover associated indication from the relay node. In some embodiments, the AS layer of the relay node may transmit the handover associated indication to the remote UE. In some embodiments, the AS layer of the relay node may indicate the reception of the handover command to the upper layer of the relay node, and the upper layer of the relay node may transmit the handover associated indication to the upper lay of the remote UE. In some embodiments, the upper layer may be a PC5-S layer or vehicle-to-everything (V2X) layer.

In operation 420, the remote UE suspends data transmission after receiving the handover associated indication. In some embodiments, the remote UE may suspend data transmission targeted at the serving cell while continuing to transmit data terminated in the relay UE.

In operation 430, the remote UE releases the PC5 connection with the relay node. When the PC5 connection between the remote UE and the relay node is released, there is no any further transmission between the remote UE and the relay node.

In operation 440, the remote UE performs relay reselection or cell reselection to select a suitable relay and/or a suitable cell.

In operation 450, the remote UE establishes an RRC connection with the selected cell. In some embodiments, the remote UE establishes a PC5 connection with the selected relay and establishes an RRC connection with a serving cell of the selected relay.

In some embodiments, upon the reception of the handover associated indication, the remote UE may keep the PC5 connection between the remote UE and the relay node.

Figure 5:
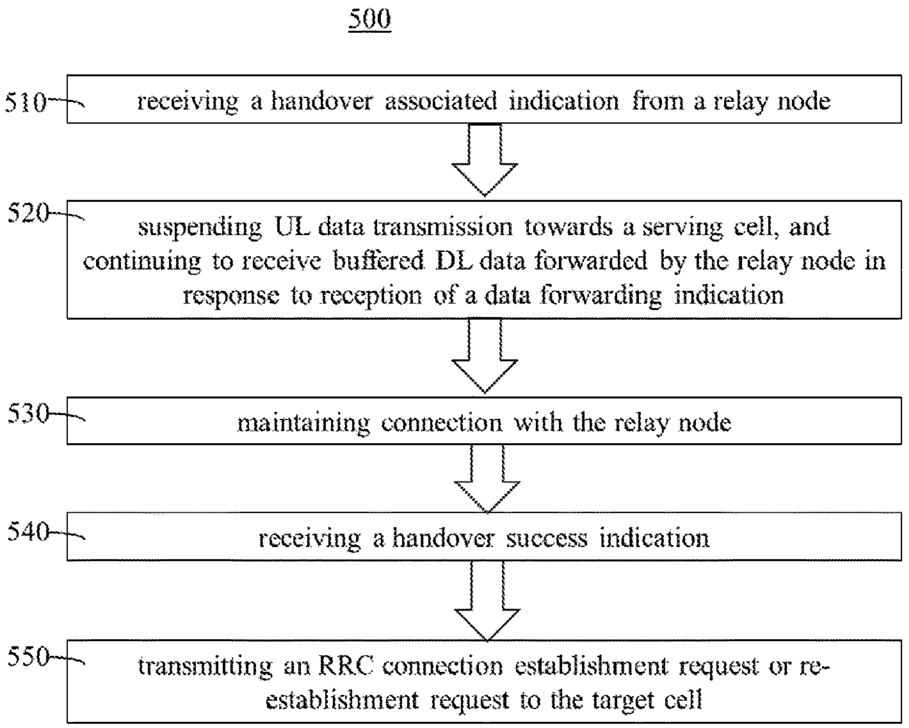
FIG. 5 illustrates a flow chart of an exemplary method performed by a remote UE according to some other embodiments of the present disclosure.

FIG. 5 illustrates a flow chart of an exemplary method 500 performed by a remote UE (e.g., UE1 in FIG. 1 or FIG. 2) upon reception of a handover associated indication from a relay node according to some embodiments of the present disclosure. In the example of FIG. 5, the relay node does not release buffered DL data and buffered UL data associated with the remote UE (i.e., the service continuity is considered) upon reception of a handover command from a serving cell, and the PC5 connection between the remote UE and the relay node is kept when the relay node performs handover.

As shown in FIG. 5, the method 500 includes at least an operation 510, an operation 520, an operation 530, an operation 540, and an operation 550.

In operation 510, the remote UE receives a handover associated indication from the relay node. In some embodiments, when there are buffered DL data in the relay node, the handover associated indication includes a data forwarding indication indicating that the relay node will continue to forward the buffered DL data to the remote UE.

In operation 520, the remote UE suspends UL data transmission towards the serving cell after receiving the handover associated indication. In some embodiments, in the operation 520, in response to the handover association indication including a data forwarding indication, the remote UE continues to receive the buffered DL data forwarded by the relay node. In some embodiments, an end-mark indication is included in the last packet of the buffered DL data forwarded by the relay node.

In operation 530, the remote UE maintains the PC5 connection with the relay node.

In operation 540, the remote UE receives a handover success indication from the relay node indicating that the handover to a target cell is successful. In some embodiments, the handover success indication may include an ID of the target cell.

In operation 550, the remote UE transmits an RRC connection establishment request or re-establishment request to the target cell.

In some embodiments, after the remote UE re-establishes to the target cell, the remote UE may trigger transmission of PDCP status report to the target cell. In some embodiments, the remote UE or the target cell may indicate the relay node to transmit the buffered UL data.

In some embodiments, the UE may receive a rejection of the RRC connection establishment request or re-establishment request from the target cell. Then, the UE may perform a cell reselection or relay reselection.

Figure 6:
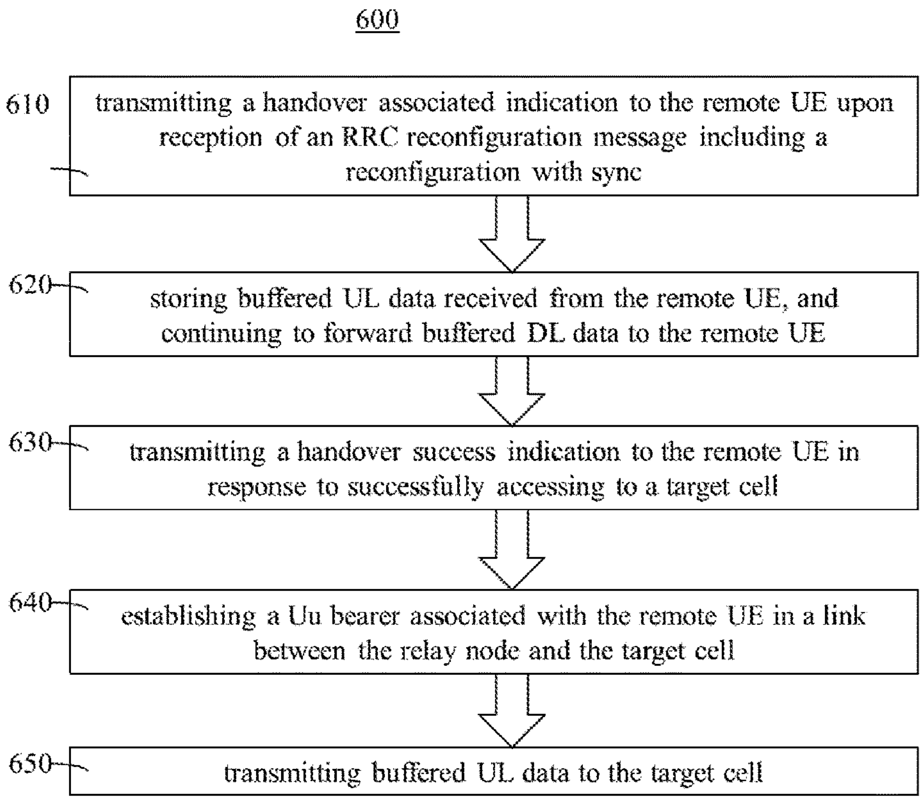
FIG. 6 illustrates a flow chart of an exemplary method performed by a relay node according to some embodiments of the present disclosure.

FIG. 6 illustrates a flow chart of an exemplary method 600 performed by a relay node, which may correspond to the method 500 performed by a remote UE, where the relay node does not release buffered DL data and buffered UL data associated with the remote UE (i.e., the service continuity is considered) upon reception of a handover command from a serving cell, and the PC5 connection between the remote UE and the relay node is still kept when the relay node performs handover.

As shown in FIG. 6, the method 600 includes at least an operation 610, an operation 620, an operation 630, an operation 640, and an operation 650.

In operation 610, the relay node transmits a handover associated indication to the remote UE upon reception of an RRC reconfiguration message including a reconfiguration with sync. In some embodiments, when there is buffered DL data in the relay node, the handover association indication includes a data forwarding indication indicating that the relay node will continue to forward the buffered DL data to the remote UE.

In operation 620, the relay node stores buffered UL data received from the remote UE such that the relay node may transmit the buffered UL data after handover. In the operation 620, when there is buffered DL data targeted at the remote UE, the relay node continues to forward the buffered DL data to the remote UE. In some embodiments, an end-mark indication is included in the last packet of the buffered DL data forwarded to the remote UE.

The relay node performs handover after receiving the handover command. In operation 630, the relay node transmits a handover success indication to the remote UE in response to successfully accessing to a target cell (i.e. in response to successful handover to the target cell). In some embodiments, the handover success indication may include an ID of the target cell.

In operation 640, the remote UE establishes a Uu bearer associated with the remote UE in a link between the relay node and the target cell in response to the successful handover to the target cell. The Uu bearer is used for transmitting buffered UL data received from the remote UE to the target cell later.

In operation 650, after the relay node successfully accesses the target cell and an end-to-end connection between the remote UE and the target cell is established, the relay node transmits buffered UL data received from the remote UE to the target cell. For example, the target cell or the remote UE may transmit an indication to the relay node, and the relay node may transmit the buffered UL data in response to the indication.

In some embodiments, the target cell may belong to a BS different from the serving cell which transmitted the handover command to the relay node. In such cases, the serving cell needs to forward data associated with the remote UE (e.g., DL data targeted at the remote UE) to the target cell. The serving cell also needs to transmit an association between an ID of the remote UE and a logical channel (or PDCP packet) in the Xn interface to the target cell. For example, the target cell may transmit an indication to indicate the serving cell to forward data associated with the remote UE to the target cell, and the serving cell may transmit the data associated with the remote UE to the target cell upon reception of the indication.

Figure 7:
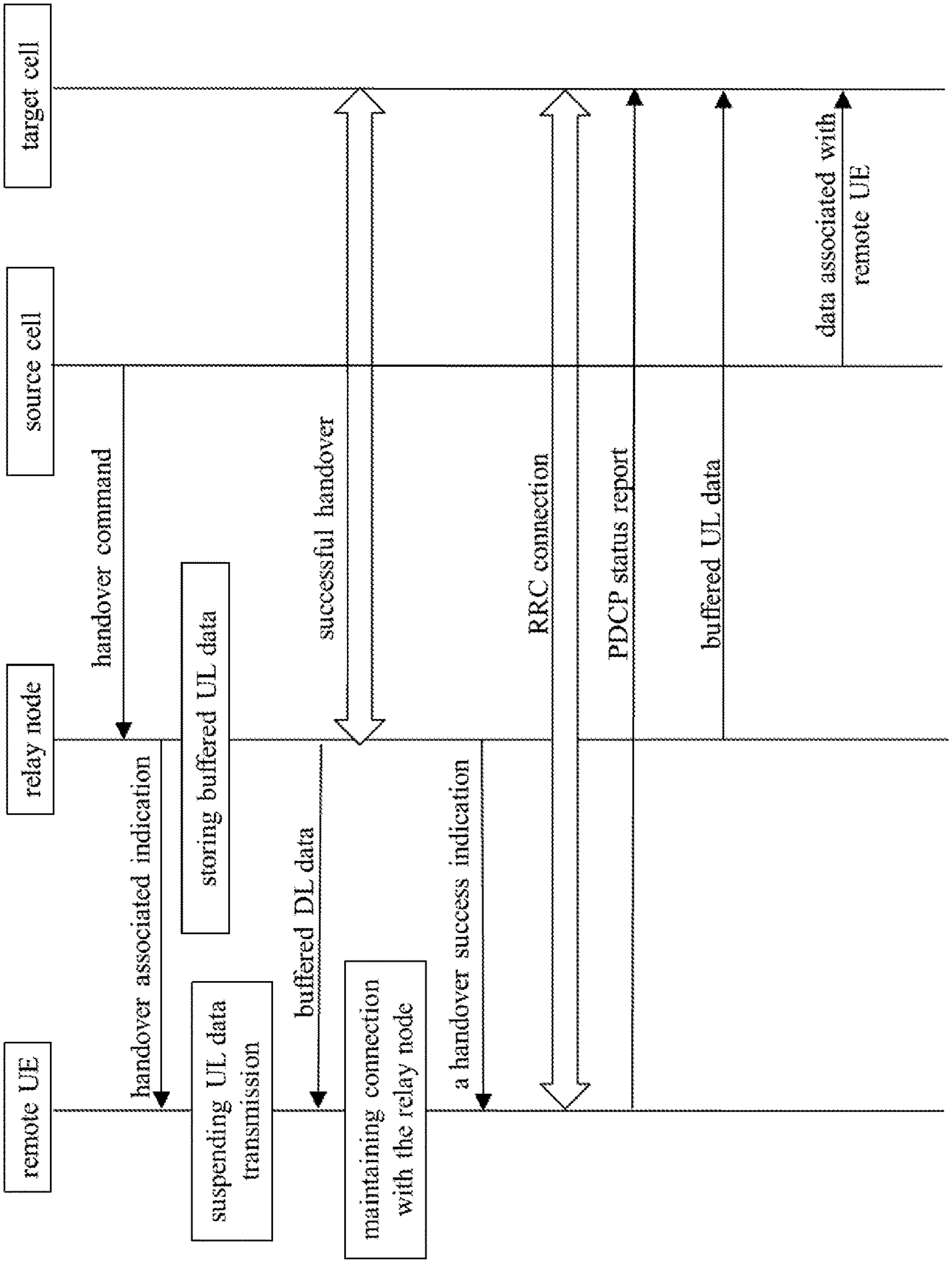
FIG. 7 illustrates an exemplary signaling sequence according to some embodiments of the present disclosure.

FIG. 7 illustrates an exemplary signaling sequence according to some embodiments of the present disclosure, which may be a combination of methods 500 and 600. It is appreciated that some signaling may be omitted in FIG. 7 for clarity and simplicity.

In the example shown in FIG. 7, a source cell (i.e., a serving cell of a relay node) transmits a handover command (e.g., an RRCReconfiguration message including reconfigurationWithSync) to the relay node. In response to receiving the handover command, the relay node transmits a handover associated indication to a remote UE via sidelink communication. The remote UE may suspend UL data transmission targeted at the source cell upon reception of the handover associated indication. The relay node may store buffered UL data received from the remote UE and continue to transmit buffered DL data to the remote UE.

The relay node performs handover to a target cell in response to the handover command. The remote UE may maintain a PC5 connection with the relay node when the relay node performs handover. After the handover is successful, the relay node transmits a handover success indication to the remote UE. The UE then establishes an end-to-end connection (e.g., an RRC connection) with the target cell. After the RRC connection between the remote UE and the target cell is established, the remote UE may transmit a PDCP status report to the target cell. The relay node may forward the buffered UL data received from the remote UE to the target cell, for example, in response to an indication received from the remote UE or the target cell after the RRC connection between the remote UE and the target cell is established.

In some embodiments, the source cell may forward the data associated with the remote UE (e.g., DL data targeted at the remote UE) to the target cell when the source cell and the target cell belong to different BSs. In some embodiments, the source cell may further transmit an association between an ID of the remote UE and a logical channel (or PDCP packet) to the target cell.

In some embodiments, the target cell may reject the remote UE's establishment request or re-establishment request for the RRC connection. In this case, the remote UE may perform relay reselection or cell reselection to determine a selected cell, and transmit an RRC connection establishment request or re-establishment request to the selected cell. In some embodiments, the remote UE may transmit an ID of the relay node, an ID of the source cell of the relay node, and an ID of the target cell to the selected cell. In some embodiments, after an end-to-end connection between the remote UE and the selected cell is established, in the case that the selected cell and the source cell belong to difference BSs, the selected cell may transmit an indication to the source cell indicating to forward data associated with the remote UE to the selected cell. Upon reception of the indication, the source cell may forward the data associated with the remote UE to the selected cell.

In some embodiments, upon the reception of the handover associated indication, the remote UE may release the PC5 connection between the remote UE and the relay node.

Figure 8:
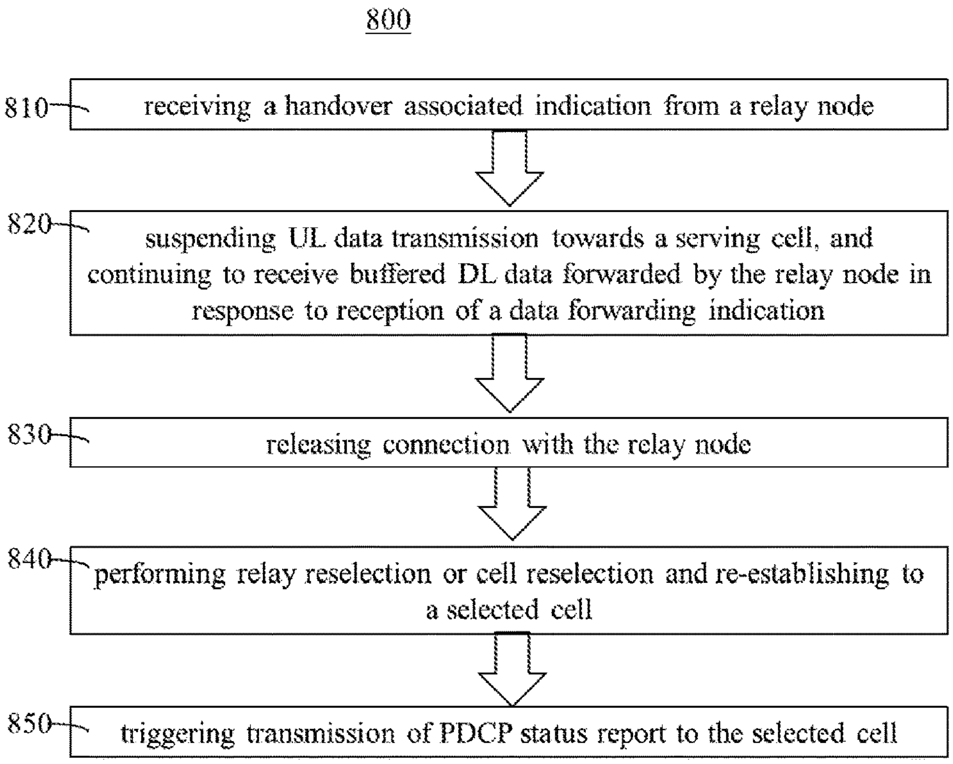
FIG. 8 illustrates a flow chart of an exemplary method performed by a remote UE according to some embodiments of the present disclosure.

FIG. 8 illustrates a flow chart of an exemplary method 800 performed by a remote UE (e.g., UE1 in FIG. 1 or FIG. 2) upon reception of a handover associated indication from a relay node according to some embodiments of the present disclosure. In the example of FIG. 8, the relay node does not release buffered DL data and buffered UL data associated with the remote UE (i.e., the service continuity is considered) upon reception of a handover command from a serving cell, and the PC5 connection between the remote UE and the relay node is released when the relay node performs handover.

As shown in FIG. 8, the method 800 includes at least an operation 810, an operation 820, an operation 830, an operation 840, and an operation 850.

In operation 810, the remote UE receives a handover associated indication from the relay node. In some embodiments, when there are buffered DL data in the relay node, the handover association indication includes a data forwarding indication indicating that the relay node will continue to forward the buffered DL data to the remote UE.

In operation 820, the remote UE suspends UL data transmission towards the serving cell after receiving the handover associated indication. In some embodiments, in the operation 820, in response to the handover association indication including a data forwarding indication, the remote UE continues to receive the buffered DL data forwarded by the relay node. In some embodiments, an end-mark indication is included in the last packet of the buffered DL data forwarded by the relay node.

In operation 830, the remote UE releases the PC5 connection with the relay node. In some embodiments, the remote UE may release the PC5 connection between the remote UE and the relay node after all the buffered DL data are received from the relay node. For example, the remote UE may release the PC5 connection in response to receiving a packet including an end-mark indication.

In operation 840, the remote UE performs relay reselection or cell reselection to determine a selected cell after the PC5 connection between the remote UE and the relay node is released, and transmits an RRC connection establishment request or re-establishment request to the selected cell to re-establish to the selected cell. In some embodiments, the remote UE may transmit an ID of the relay node, an ID of the serving cell of the relay node (i.e., the ID of the source cell of the relay node before handover), and an ID of a target cell associated with handover of the relay node to the selected cell.

In operation 850, the remote UE triggers transmission of PDCP status report to the selected cell after the remote UE re-establishes to the selected cell.

Figure 9:
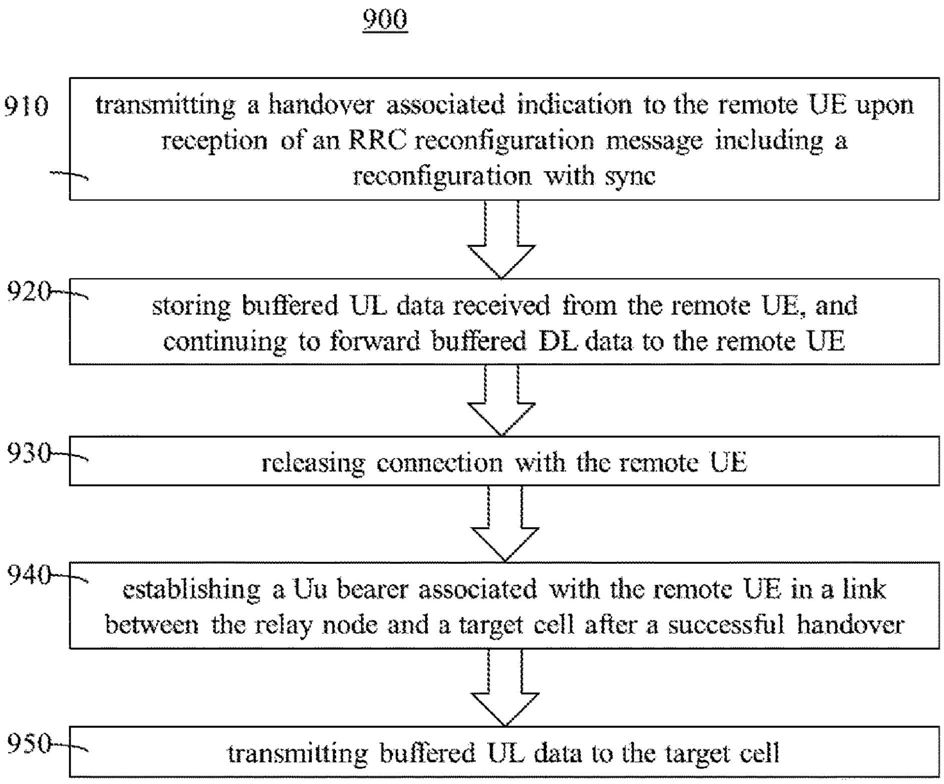
FIG. 9 illustrates a flow chart of an exemplary method performed by a relay node according to some embodiments of the present disclosure.

FIG. 9 illustrates a flow chart of an exemplary method 900 performed by a relay node, which may correspond to the method 800 performed by a remote UE, where the relay node does not release buffered DL data and buffered UL data associated with the remote UE (i.e., the service continuity is considered) upon reception of a handover command from a serving cell, and the PC5 connection between the remote UE and the relay node is released when the relay node performs handover.

As shown in FIG. 9, the method 900 includes at least an operation 910, an operation 920, an operation 930, an operation 940, and an operation 950.

In operation 910, the relay node transmits a handover associated indication to the remote UE upon reception of an RRC reconfiguration message including a reconfiguration with sync. In some embodiments, when there is buffered DL data in the relay node, the handover association indication includes a data forwarding indication indicating that the relay node will continue to forward the buffered DL data to the remote UE.

In operation 920, the relay node stores buffered UL data received from the remote UE such that the relay node may transmit the buffered UL data after handover. In the operation 920, when there is buffered DL data targeted at the remote UE, the relay node continues to forward the buffered DL data to the remote UE. In some embodiments, an end-mark indication is included in the last packet of the buffered DL data forwarded to the remote UE.

In operation 930, the relay node releases the PC5 connection with the remote UE. In some embodiments, the relay node may release the PC5 connection between the remote UE and the relay node after all the buffered DL data are transmitted to the remote UE.

The relay node performs handover after receiving the handover command. In operation 940, after a successful handover to a target cell, the relay node establishes a Uu bearer associated with the remote UE in a link between the relay node and the target cell. The Uu bearer is used for transmitting buffered UL data received from the remote UE to the target cell later.

In operation 950, the relay node transmits the buffered UL data received from the remote UE to the target cell.

After the relay node successfully accesses the target cell and an end-to-end connection between the remote UE and a cell selected through a cell reselection or relay reselection is established, the selected cell may transmit an indication to the source cell of the remote UE (i.e., the serving cell transmits the RRC reconfiguration message including a reconfiguration with sync) to indicate the source cell to forward data associated with the remote UE (e.g., DL data targeted at the remote UE) to the selected cell. Upon reception of the indication, the source cell may transmit the data associated with the remote UE to the selected cell. In some embodiments, the selected cell may also transmit an indication to the target cell of the relay node to indicate the relay node to forward data associated with the remote UE (e.g., UL data received from the remote UE) to the selected cell. Upon reception of the indication, the target cell may transmit the data associated with the remote UE to the selected cell.

Figure 10:
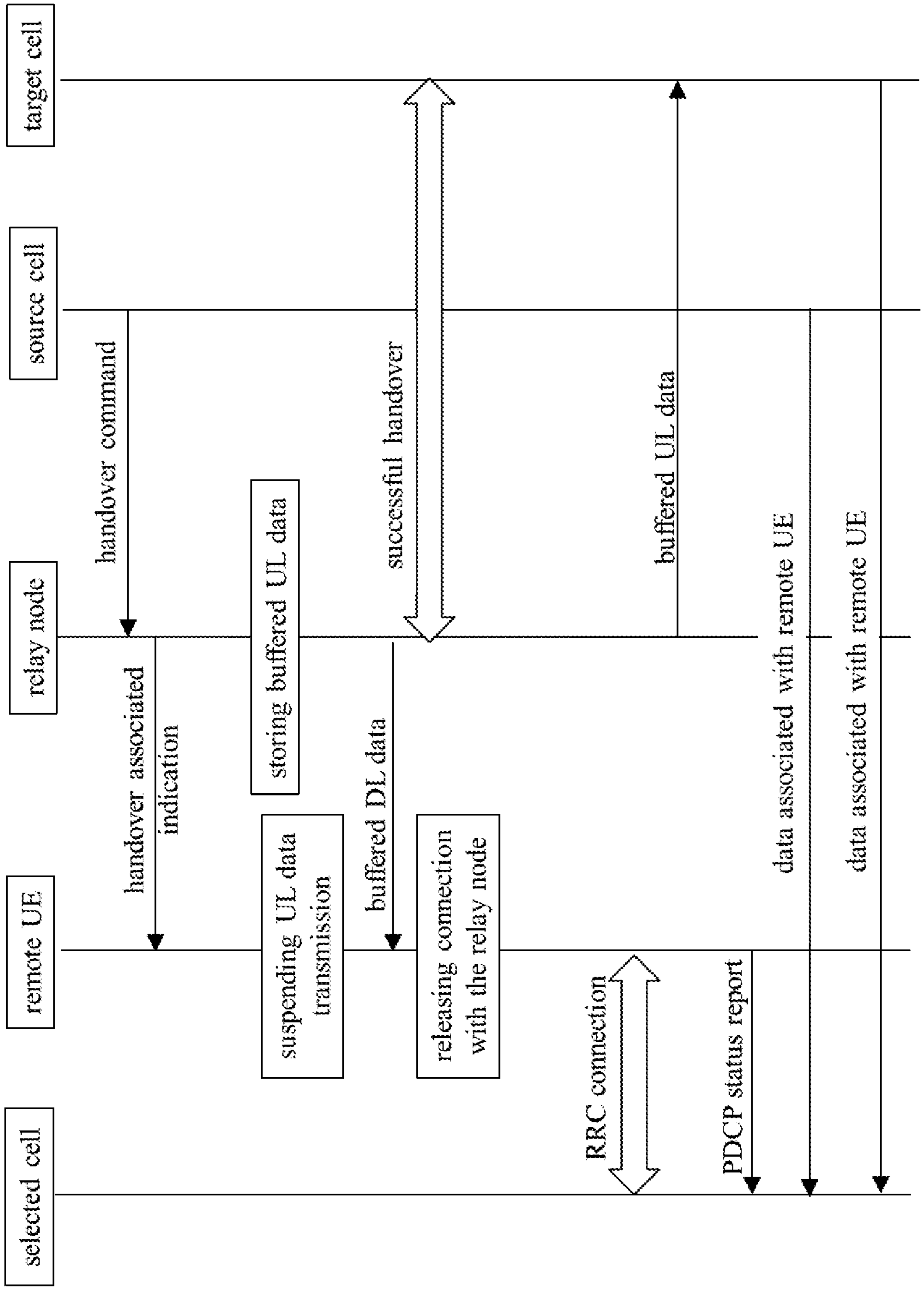
FIG. 10 illustrates an exemplary signaling sequence according to some embodiments of the present disclosure.

FIG. 10 illustrates an exemplary signaling sequence according to some embodiments of the present disclosure, which may be a combination of methods 800 and 900. It is appreciated that some signaling may be omitted in FIG. 10 for clarity and simplicity.

In the example shown in FIG. 10, a source cell (i.e., a serving cell of a relay node) transmits a handover command (e.g., an RRCReconfiguration message including reconfigurationWithSync) to the relay node. In response to receiving the handover command, the relay node transmits a handover associated indication to a remote UE via sidelink communication. The remote UE may suspend UL data transmission targeted at the source cell upon reception of the handover associated indication. The relay node may store buffered UL data received from the remote UE and continue to transmit buffered DL data to the remote UE.

The relay node performs handover to a target cell in response to the handover command. The remote UE may release a PC5 connection with the relay node when the relay node performs handover (e.g., after the remote UE receives all the buffered DL data from the relay node). After the handover is successful, the relay node may forward the buffered UL data received from the remote UE to the target cell.

The remote UE establishes an end-to-end connection (e.g., an RRC connection) with a selected cell. After the RRC connection between the remote UE and the selected cell is established, the remote UE may transmit a PDCP status report to the selected cell.

In some embodiments, the source cell may forward data associated with the remote UE (e.g., DL data targeted at the remote UE) to the selected cell, for example, when the selected cell and the source cell belong to different BSs and in response to an indication received from the selected cell. In some embodiments, the target cell of the relay node may forward data associated with the remote UE (e.g., UL data received from the remote UE, which is received from the relay node) to the selected cell, for example, when the selected cell and the target cell belong to different BSs and in response to an indication received from the selected cell.

It is appreciated that some other signaling is possibly not shown in FIGS. 3, 7, and 10.

It is also appreciated that the order of the operations shown in FIGS. 4, 5, 6, 8, and 9 or descripted in the various embodiments of the present disclosure may be reasonably flexible, as long as it does not violate the spirit of the present disclosure.

According to the present disclosure, assistant information is designed to assist the relay node to perform later operations upon reception of an RRC reconfiguration message including a reconfiguration with sync. The assistant information is also useful for the remote UE According to the present disclosure, the mechanism of handling data buffered in the relay node when the relay node performs handover or when the relay node receives the handover command is considered, and the service continuity is taken into consideration in some embodiments.

According to the present disclosure, the mechanism of whether to keep or release the PC5 connection between the remote UE and the relay node in combination with service continuity is discussed.

The present disclosure provides solutions to process the service continuity related with the buffered data in the relay node and the PC5 connection between the remote UE and the relay node when the relay node receives a handover command.

Figure 11:
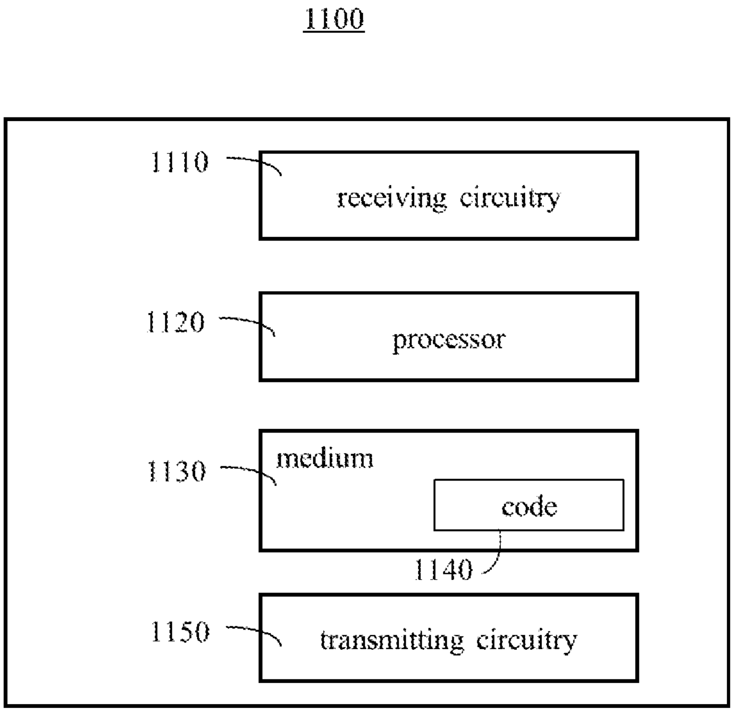
FIG. 11 illustrates a simplified block diagram of an exemplary apparatus according to some embodiments of the present disclosure.

FIG. 11 illustrates a simplified block diagram of an exemplary apparatus 1100 according to some embodiments of the present disclosure. The apparatus 1100 may be or include at least a part of a remote UE.

As shown in FIG. 11, the apparatus 1100 may include at least one receiving circuitry 1110, at least one processor 1120, at least one non-transitory computer-readable medium 1130 with computer-executable program code 1140 stored thereon, and at least one transmitting circuitry 1150. The at least one receiving circuitry 1110, the at least one non-transitory computer-readable medium 1130, and the at least one transmitting circuitry 1150 may be coupled to the at least one processor 1120. In some embodiments, the at least one receiving circuitry 1110, the at least one non-transitory computer-readable medium 1130, the at least one transmitting circuitry 1150, and the at least one processor 1120 may be coupled to each other via one or more local buses.

Although in FIG. 11, elements such as receiving circuitry 1110, transmitting circuitry 1150, non-transitory computer-readable medium 1130, and processor 1120 are described in the singular, the plural is contemplated unless limitation to the singular is explicitly stated. In some embodiments of the present application, the at least one receiving circuitry 1110 and the at least one transmitting circuitry 1150 may be configured for wireless communication. In some embodiments of the present application, the at least one receiving circuitry 1110 and the at least one transmitting circuitry 1150 can be integrated into at least one transceiver (e.g., wireless transceiver). In certain embodiments of the present disclosure, the apparatus 1100 may further include a memory and/or other components.

The computer-executable program code 1140 may be configured to be executable by the at least one processor 1120 to cause the apparatus 1100 at least to perform any one of the various methods described above which are performed by a remote UE according to the present disclosure. In some embodiments, the at least one processor 1120 may be configured to perform, with the at least one receiving circuitry 1110 and the at least one transmitting circuitry 1150, any one of the various methods described above which are performed by a remote UE according to the present disclosure.

Figure 12:
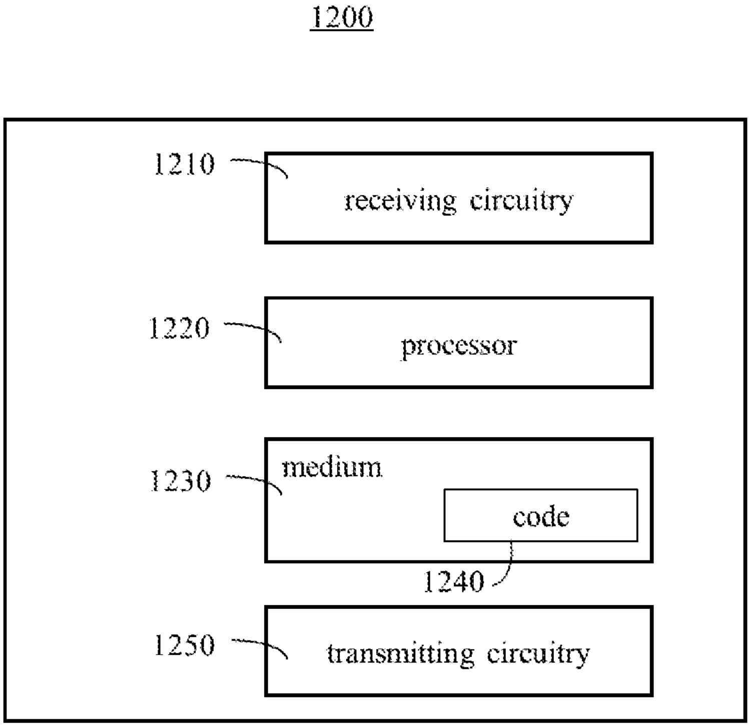
FIG. 12 illustrates a simplified block diagram of an exemplary apparatus according to some other embodiments of the present disclosure.

FIG. 12 illustrates a simplified block diagram of an exemplary apparatus 1200 according to some embodiments of the present disclosure. The apparatus 1200 may be or include at least a part of a relay node.

As shown in FIG. 12, the apparatus 1200 may include at least one receiving circuitry 1210, at least one processor 1220, at least one non-transitory computer-readable medium 1230 with computer-executable program code 1240 stored thereon, and at least one transmitting circuitry 1250. The at least one receiving circuitry 1210, the at least one non-transitory computer-readable medium 1230, and the at least one transmitting circuitry 1250 may be coupled to the at least one processor 1220. In some embodiments, the at least one receiving circuitry 1210, the at least one non-transitory computer-readable medium 1230, the at least one transmitting circuitry 1250, and the at least one processor 1220 may be coupled to each other via one or more local buses.

Although in FIG. 12, elements such as receiving circuitry 1210, transmitting circuitry 1250, non-transitory computer-readable medium 1230, and processor 1220 are described in the singular, the plural is contemplated unless limitation to the singular is explicitly stated. In some embodiments of the present application, the at least one receiving circuitry 1210 and the at least one transmitting circuitry 1250 may be configured for wireless communication. In some embodiments of the present application, the at least one receiving circuitry 1210 and the at least one transmitting circuitry 1250 can be integrated into at least one transceiver (e.g., wireless transceiver). In certain embodiments of the present disclosure, the apparatus 1200 may further include a memory and/or other components.

The computer-executable program code 1240 may be configured to be executable by the at least one processor 1220 to cause the apparatus 1200 at least to perform any one of the various methods described above which are performed by a relay node according to the present disclosure. In some embodiments, the at least one processor 1220 may be configured to perform, with the at least one receiving circuitry 1210 and the at least one transmitting circuitry 1250, any one of the various methods described above which are performed by a relay node according to the present disclosure.

Figure 13:
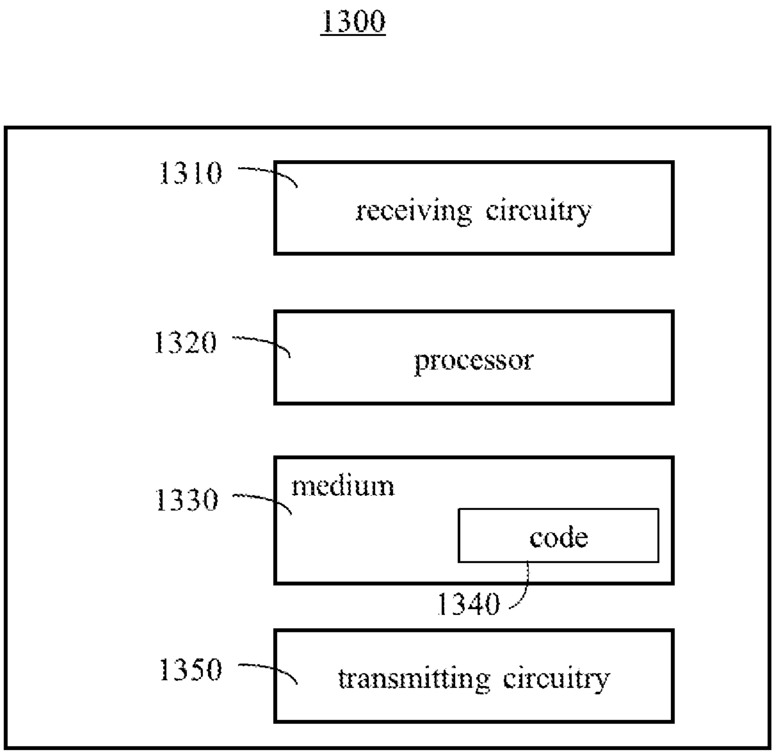
FIG. 13 illustrates a simplified block diagram of an exemplary apparatus according to some other embodiments of the present disclosure.

FIG. 13 illustrates a simplified block diagram of an exemplary apparatus 1300 according to some embodiments of the present disclosure. The apparatus 1300 may be or include at least a part of a BS.

As shown in FIG. 13, the apparatus 1300 may include at least one receiving circuitry 1310, at least one processor 1320, at least one non-transitory computer-readable medium 1330 with computer-executable program code 1340 stored thereon, and at least one transmitting circuitry 1350. The at least one receiving circuitry 1310, the at least one non-transitory computer-readable medium 1330, and the at least one transmitting circuitry 1350 may be coupled to the at least one processor 1320. In some embodiments, the at least one receiving circuitry 1310, the at least one non-transitory computer-readable medium 1330, the at least one transmitting circuitry 1350, and the at least one processor 1320 may be coupled to each other via one or more local buses.

Although in FIG. 13, elements such as receiving circuitry 1310, transmitting circuitry 1350, non-transitory computer-readable medium 1330, and processor 1320 are described in the singular, the plural is contemplated unless limitation to the singular is explicitly stated. In some embodiments of the present application, the at least one receiving circuitry 1310 and the at least one transmitting circuitry 1350 may be configured for wireless communication. In some embodiments of the present application, the at least one receiving circuitry 1310 and the at least one transmitting circuitry 1350 can be integrated into at least one transceiver (e.g., wireless transceiver). In certain embodiments of the present disclosure, the apparatus 1300 may further include a memory and/or other components.

The computer-executable program code 1340 may be configured to be executable by the at least one processor 1320 to cause the apparatus 1300 at least to perform any one of the various methods described above which are performed by a relay node according to the present disclosure. In some embodiments, the at least one processor 1320 may be configured to perform, with the at least one receiving circuitry 1310 and the at least one transmitting circuitry 1350, any one of the various methods described above which are performed by a cell (e.g., serving cell, source cell, target cell, or selected cell) according to the present disclosure.

In various example embodiments, the at least one processor 1120, 1220, or 1320 may include, but is not limited to, at least one hardware processor, including at least one microprocessor such as a CPU, a portion of at least one hardware processor, and any other suitable dedicated processor such as those developed based on for example Field Programmable Gate Array (FPGA) and Application Specific Integrated Circuit (ASIC). Further, the at least one processor 1120, 1220, or 1320 may also include at least one other circuitry or element not shown in FIG. 11, FIG. 12, or FIG. 13.

In various example embodiments, the at least one non-transitory computer-readable medium 1130, 1230, or 1330 may include at least one storage medium in various forms, such as a volatile memory and/or a non-volatile memory. The volatile memory may include, but is not limited to, for example, an RAM, a cache, and so on. The non-volatile memory may include, but is not limited to, for example, an ROM, a hard disk, a flash memory, and so on. Further, the at least non-transitory computer-readable medium 1130, 1230, or 1330 may include, but is not limited to, an electric, a magnetic, an optical, an electromagnetic, an infrared, or a semiconductor system, apparatus, or device or any combination of the above. Further, in various example embodiments, the example apparatus 1100, 1200, or 1300 may also include at least one other circuitry, element, and interface, for example antenna element, and the like.

In various example embodiments, the circuitries, parts, elements, and interfaces in the example apparatus 1100, 1200, or 1300, including the at least one processor 1120, 1220, 1320 and the at least one non-transitory computer-readable medium 1130, 1230, 1330, may be coupled together via any suitable connections including, but not limited to, buses, crossbars, wiring and/or wireless lines, in any suitable ways, for example electrically, magnetically, optically, electromagnetically, and the like.

The methods of the present disclosure can be implemented on a programmed processor. However, controllers, flowcharts, and modules may also be implemented on a general purpose or special purpose computer, a programmed microprocessor or microcontroller and peripheral integrated circuit elements, an integrated circuit, a hardware electronic or logic circuit such as a discrete element circuit, a programmable logic device, or the like. In general, any device that has a finite state machine capable of implementing the flowcharts shown in the figures may be used to implement the processing functions of the present disclosure.

While the present disclosure has been described with specific embodiments thereof, it is evident that many alternatives, modifications, and variations will be apparent to those skilled in the art. For example, various components of the embodiments may be interchanged, added, or substituted in other embodiments. Also, all of the elements shown in each figure are not necessary for operation of the disclosed embodiments. For example, one skilled in the art of the disclosed embodiments would be capable of making and using the teachings of the present disclosure by simply employing the elements of the independent claims. Accordingly, the embodiments of the present disclosure as set forth herein are intended to be illustrative, not limiting. Various changes may be made without departing from the spirit and scope of the present disclosure.

The terms "comprises," "comprising," "includes," "including," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a," "an," or the like does not, without more constraints, preclude the existence of additional identical elements in the process, method, article, or apparatus that comprises the element. Also, the term "another" is defined as at least a second or more. The terms "including," "having," and the like, as used herein, are defined as "comprising."

What is claimed is:

1. An apparatus for performing operations of a relay node, comprising:
- at least one memory; and
- at least one processor coupled with the at least one memory and configured to cause the apparatus to:
  - receive, from a serving cell to which the relay node is connected, a radio resource control (RRC) reconfiguration message including a reconfiguration with synchronization for handover of the relay node from the serving cell to a target cell; and
  - transmit, via sidelink communication and in a sidelink message separate from the RRC reconfiguration message, a handover associated indication to a remote user equipment (UE) in response to reception of the RRC reconfiguration message including the reconfiguration with synchronization.

2. The apparatus of claim 1, wherein the RRC reconfiguration message further includes at least one of:
- a first indication indicating whether a PC5 connection between the relay node and the remote UE is to be released when the relay node performs handover; and
- a second indication indicating whether the target cell associated with the handover of the relay node supports relay functionality.

3. The apparatus of claim 1, wherein the handover associated indication includes an identifier (ID) of the target cell associated with the handover of the relay node.

4. The apparatus of claim 1, wherein the handover associated indication indicates reception of the RRC reconfiguration message including the reconfiguration with synchronization or indicates that the relay node performs handover.

5. The apparatus of claim 1, wherein the at least one processor is configured to cause the apparatus to indicate, by an access stratum (AS) layer of the relay node, reception of the RRC reconfiguration message including the reconfiguration with synchronization to an upper layer of the relay node.

6. The apparatus of claim 1, wherein the at least one processor is configured to cause the apparatus to release buffered uplink (UL) data received from the remote UE and buffered downlink (DL) data received from a base station when the relay node performs handover.

7. The apparatus of claim 1, wherein the at least one processor is configured to cause the apparatus to:
- store buffered uplink (UL) data received from the remote UE in response to the reception of the RRC reconfiguration message including the reconfiguration with synchronization; or
- transmit the buffered UL data to the target cell in response to successful handover to the target cell.

8. The apparatus of claim 7, wherein the at least one processor is configured to cause the apparatus to establish a Uu bearer associated with the remote UE in a link between the relay node and the target cell in response to the successful handover to the target cell.

9. The apparatus of claim 1, wherein the handover associated indication includes a data forwarding indication, and the at least one processor is configured to cause the apparatus to transmit buffered downlink (DL) data received from a base station to the remote UE when the relay node performs handover.

10. The apparatus of claim 9, wherein the at least one processor is configured to cause the apparatus to add an end-mark indication in a last packet of the buffered DL data transmitted to the remote UE.

11. The apparatus of claim 9, wherein the at least one processor is configured to cause the apparatus to release a PC5 connection between the relay node and the remote UE after the relay node transmits all the buffered DL data.

12. The apparatus of claim 1, wherein the at least one processor is configured to cause the apparatus to:
- transmit a handover success indication to the remote UE in response to successful handover to the target cell.

13. The apparatus of claim 12, wherein the handover success indication includes an identifier (ID) of the target cell.

14. A user equipment (UE), comprising:

at least one memory; and at least one processor coupled with the at least one memory and configured to cause the UE to:

access a serving cell of a base station via a relay node, the relay node being connected to the serving cell; and receive, via sidelink communication and in a sidelink message separate from a first radio resource control (RRC) reconfiguration message, a handover associated indication from the relay node, wherein the handover associated indication indicates that the relay node has received, from the serving cell, the first RRC reconfiguration message including a reconfiguration with synchronization for handover of the relay node from the serving cell to a target cell.

15. A method performed by a relay node, comprising:

receiving, from a serving cell to which the relay node is connected, a radio resource control (RRC) reconfiguration message including a reconfiguration with synchronization for handover of the relay node from the serving cell to a target cell; and transmitting, via sidelink communication and in a sidelink message separate from the RRC reconfiguration message, a handover associated indication to a remote user equipment (UE) in response to reception of the RRC reconfiguration message including the reconfiguration with synchronization.

16. A method performed by a user equipment (UE), the method comprising:

accessing a serving cell of a base station via a relay node, the relay node being connected to the serving cell; and receiving, via sidelink communication and in a sidelink message separate from a radio resource control (RRC) reconfiguration message, a handover associated indication from the relay node, wherein the handover associated indication indicates that the relay node has received, from the serving cell, the first RRC reconfiguration message including a reconfiguration with synchronization for handover of the relay node from the serving cell to a target cell.

17. The method of claim 16, further comprising receiving a second RRC reconfiguration message from the serving cell, wherein the second RRC reconfiguration message includes a list of at least one candidate relay node belonging to the serving cell or a list of at least one candidate relay node belonging to the base station.

18. The method of claim 16, further comprising:

performing measurement toward at least one candidate relay node and at least one neighbor cell; and transmitting a measurement report to the serving cell of the base station, wherein the measurement report includes at least one of: an identifier (ID) of the serving cell, at least one serving base station ID of the at least one neighbor cell, and sidelink (SL) reference signal received power (RSRP) information.

19. The method of claim 16, wherein the handover associated indication includes an identifier (ID) of the target cell associated with the handover of the relay node.

20. The method of claim 16, further comprising:

suspending data transmission terminating at the serving cell in response to reception of the handover associated indication.

* * * * *